(12) United States Patent
Yamamoto

(10) Patent No.: US 12,386,128 B2
(45) Date of Patent: Aug. 12, 2025

(54) SUBSTRATE WITH OPTICAL WAVEGUIDE AND OPTICAL COMMUNICATION DEVICE

(71) Applicant: SHINKO ELECTRIC INDUSTRIES CO., LTD., Nagano (JP)

(72) Inventor: Kazunao Yamamoto, Nagano (JP)

(73) Assignee: SHINKO ELECTRIC INDUSTRIES CO., LTD., Nagano (JP)

( * ) Notice: Subject to any disclaimer, the term of this patent is extended or adjusted under 35 U.S.C. 154(b) by 273 days.

(21) Appl. No.: 18/350,807

(22) Filed: Jul. 12, 2023

(65) Prior Publication Data

US 2024/0027713 A1 Jan. 25, 2024

(30) Foreign Application Priority Data

Jul. 19, 2022 (JP) .................................. 2022-114561

(51) Int. Cl.
 *G02B 6/43* (2006.01)
 *G02B 6/42* (2006.01)

(52) U.S. Cl.
 CPC ............. *G02B 6/43* (2013.01); *G02B 6/4214* (2013.01)

(58) Field of Classification Search
 CPC .................................. G02B 6/43; G02B 6/4214
 See application file for complete search history.

(56) References Cited

U.S. PATENT DOCUMENTS

| 7,720,327 B2 * | 5/2010 | Yanagisawa | ......... G02B 6/4214 385/14 |
| 2009/0074354 A1 | 3/2009 | Yanagisawa | |
| 2017/0293096 A1 * | 10/2017 | Yamamoto | ............. G02B 6/428 |

FOREIGN PATENT DOCUMENTS

JP  2009-069668  4/2009

* cited by examiner

*Primary Examiner* — Michael P Mooney

(74) *Attorney, Agent, or Firm* — IPUSA, PLLC

(57) ABSTRACT

A substrate with optical waveguide includes an interconnect substrate and an optical waveguide formed on the interconnect substrate, wherein the optical waveguide includes a first cladding layer, a first protrusion formed on the first cladding layer, the first protrusion having an upper surface and an inclined surface connected to, and sloping relative to, the upper surface, a first metal film formed at least on the inclined surface, a core layer formed on the first cladding layer such as to cover part of the first metal film, and a second cladding layer formed on the first cladding layer such as to cover the core layer, wherein in plan view, a perimeter of a first surface region constituted by both the upper surface and the inclined surface does not have a corner where two lines meet, except for a part thereof where the inclined surface meets the first cladding layer.

8 Claims, 11 Drawing Sheets

SUBSTRATE WITH OPTICAL WAVEGUIDE AND OPTICAL COMMUNICATION DEVICE

CROSS-REFERENCE TO RELATED APPLICATIONS

The present application is based on and claims priority to Japanese Patent Application No. 2022-114561 filed on Jul. 19, 2022, with the Japanese Patent Office, the entire contents of which are incorporated herein by reference.

FIELD

The invention relates to substrates with optical waveguides and optical communication devices.

BACKGROUND

In some technology known in the art, a substrate has an optical waveguide that includes a core layer sandwiched between a first cladding layer and a second cladding layer, and has a protrusion having an inclined surface that slopes at approximately 45 degrees relative to the direction of light propagation through the core layer, with a metal film formed on the inclined surface. The metal film is formed on the protrusion by, for example, vapor deposition or the like performed through a mask made of metal or the like placed above the protrusion.

When the mask is placed above the protrusion for forming a metal film, the mask may come into contact with the protrusion, which may result in the breakage of the protrusion.

Accordingly, there may be a need for a substrate having an optical waveguide in which a protrusion for forming a metal film has such shape as to be unlikely to break.

RELATED ART DOCUMENTS

Patent Document

[Patent Document 1] Japanese Laid-Open Patent Publication No. 2009-69668

SUMMARY

According to an aspect of the embodiment, a substrate with optical waveguide includes an interconnect substrate and an optical waveguide formed on the interconnect substrate, wherein the optical waveguide includes a first cladding layer, a first protrusion formed on an upper surface of the first cladding layer, the first protrusion having an upper surface and an inclined surface, the inclined surface being connected to the upper surface of the first protrusion, the inclined surface sloping relative to the upper surface of the first protrusion, a first metal film formed at least on the inclined surface of the first protrusion, a core layer formed on the upper surface of the first cladding layer such as to cover part of the first metal film, and a second cladding layer formed on the upper surface of the first cladding layer such as to cover at least an upper surface and side surfaces of the core layer, wherein in plan view, a perimeter of a first surface region constituted by both the upper surface and the inclined surface of the first protrusion does not have a corner where two lines meet, except for a part thereof where the inclined surface meets the upper surface of the first cladding layer.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1A:
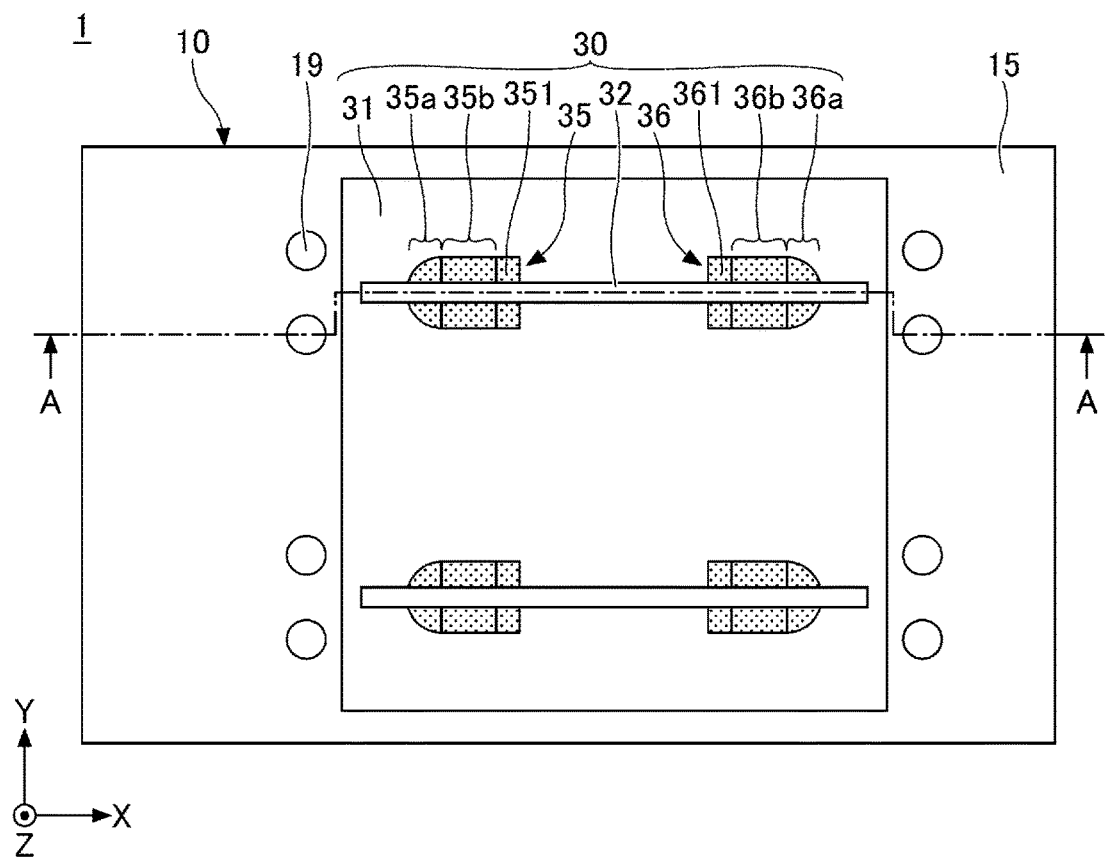
FIGS. 1A and 1B are drawings illustrating an example of the structure of a substrate with optical waveguides according to a first embodiment.

In the following, embodiments of the present invention will be described with reference to the accompanying drawings.

Embodiments for carrying out the invention will be described below with reference to the accompanying drawings. In the drawings, the same components are referred to by the same numerals, and a duplicate description thereof may be omitted.

First Embodiment

Structure of Substrate with Optical Waveguide

Figure 1B:
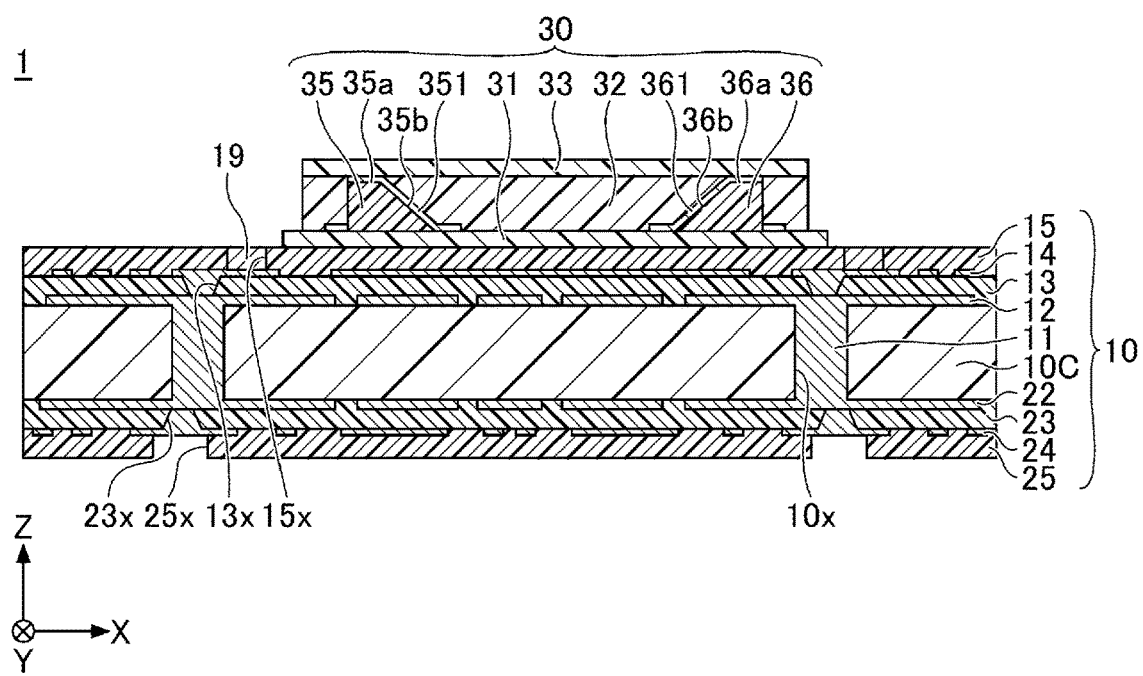

In the following, the structure of a substrate with an optical waveguide will be described. FIGS. 1A and 1B are drawings illustrating an example of the structure of a substrate with optical waveguides according to a first embodiment, FIG. 1A is a plan view, and FIG. 1B is a cross-sectional view taken along the line A-A in FIG. 1A. In FIG. 1A, a second cladding layer 33 illustrated in FIG. 1B is omitted. In FIGS. 1A and 1B, the X direction, Y direction and Z direction perpendicular to each other are defined for reference purposes. Similar definitions of directions may be provided in some of the remaining drawings as necessary.

As illustrated in FIGS. 1A and 1B, a substrate 1 with optical waveguides according to the first embodiment includes an interconnect substrate 10 and an optical waveguide 30 formed on the interconnect substrate 10. In this example, the plane shape of the interconnect substrate 10 is rectangular, the long sides of the rectangle are parallel to the X direction, and the short sides of the rectangle are parallel to the Y direction. The Z direction is the direction in which the layers constituting the interconnect substrate 10 are stacked.

Interconnect Substrate

The interconnect substrate 10 is structured such that interconnect layers and insulating layers are stacked on both sides of a core substrate 10C. Specifically, the interconnect substrate 10 includes an interconnect layer 12, an insulating layer 13, an interconnect layer 14, and a solder resist layer 15 stacked in this order on one surface (i.e., upper surface) of the core substrate 10C. Further, an interconnect layer 22, an insulating layer 23, an interconnect layer 24, and a solder resist layer 25 are stacked in this order on the other surface (i.e., lower surface) of the core substrate 10C.

The core substrate 10C may be, for example, a glass epoxy substrate as known in the art, in which a glass cloth is impregnated with an insulating resin such as an epoxy-based resin. The core substrate 10C may alternatively be a substrate in which a woven or nonwoven fabric such as glass fiber, carbon fiber, or aramid fiber is impregnated with an epoxy-based resin, a polyimide-based resin, or the like. The thickness of the core substrate 10C may be, for example, about 60 μm to 400 μm. The core substrate 10C has through-holes 10x extending through the core substrate 10C in the thickness direction. The plane shape of each through-hole 10x is, for example, circular.

The interconnect layer 12 is formed on the upper surface of the core substrate 10C. The interconnect layer 22 is formed on the lower surface of the core substrate 10C. The interconnect layer 12 and the interconnect layer 22 are electrically connected by through-interconnects 11 formed in the through-holes 10x. The interconnect layers 12 and 22 are each patterned in a predetermined plane shape. Copper (Cu) or the like, for example, may be used as a material for the interconnect layers 12 and 22 and the through-interconnects 11. The thickness of the interconnect layers 12 and 22 may be, for example, about 10 μm to 30 μm. The interconnect layer 12, the interconnect layer 22 and the through-interconnects 11 may be formed together as one seamless continuous piece.

The insulating layer 13 covers the interconnect layer 12 on the upper surface of the core substrate 10C. The material of the insulating layer 13 may be, for example, an insulating resin mainly composed of epoxy-based resin or polyimide-based resin. The thickness of the insulating layer 13 may be, for example, about 30 μm to 40 μm. The insulating layer 13 may contain a filler such as silica ($SiO_2$).

The interconnect layer 14 is formed on the upper surface of the insulating layer 13. The interconnect layer 14 includes interconnect patterns formed on the upper surface of the insulating layer 13 and via interconnects filling via holes 13x that extend through the insulating layer 13 to expose the upper surface of the interconnect layer 12. The interconnect layer 14 is electrically connected to the interconnect layer 12. The via holes 13x may be an inverted frustoconical recess in which the diameter of the top opening toward the solder resist layer 15 is larger than the diameter of the bottom opening at the upper surface of the interconnect layer 12. The material of the interconnect layer 14 and the thickness of the interconnect patterns constituting the interconnect layer 14 may be the same as, for example, those of the interconnect layer 12.

The solder resist layer 15 is the outermost layer on the upper side of the interconnect substrate 10, and is formed on the upper surface of the insulating layer 13 to cover the interconnect layer 14. The solder resist layer 15 may be made of, for example, a photosensitive resin such as an epoxy-based resin or an acrylic-based resin. The thickness of the solder resist layer 15 may be, for example, about 15 μm to 35 μm.

The solder resist layer 15 has openings 15x, and part of the upper surface of the interconnect layer 14 is exposed at the bottom of the openings 15x. The plane shape of each opening 15x may be, for example, circular. According to need, the upper surface of the interconnect layer 14 exposed inside the openings 15x may have a metal film formed thereon or subjected to an antioxidant treatment such as OSP (organic solderability preservative) treatment. Examples of such a metal film include an Au layer, a Ni/Au layer (i.e., a metal film composed of a Ni layer and an Au layer stacked in this order), a Ni/Pd/Au layer (i.e., a metal film composed of a Ni layer, a Pd layer and an Au layer stacked in this order), etc.

External connection terminals 19 are formed on the interconnect layer 14 exposed in the openings 15x. The external connection terminals 19 are, for example, solder bumps. The material of the solder bumps may be, for example, an alloy containing Pb, an alloy of Sn and Cu, an alloy of Sn and Ag, an alloy of Sn, Ag and Cu, or the like. The external connection terminals 19 are for electrical connection to light emitting or light receiving devices.

The insulating layer 23 is formed on the lower surface of the core substrate 10C to cover the interconnect layer 22. The material and thickness of the insulating layer 23 may be the same as, for example, those of the insulating layer 13. The insulating layer 23 may contain a filler such as silica ($SiO_2$). The interconnect layer 24 is formed on the lower surface of the insulating layer 23. The interconnect layer 24 includes interconnect patterns formed on the lower surface of the insulating layer 23, and includes via interconnects filling via holes 23x that extend through the insulating layer 23 to expose the lower surface of the interconnect layer 22. The interconnect layer 24 is electrically connected to the interconnect layer 22. The via holes 23x may each be a frustoconical recess in which the diameter of the lower opening toward the solder resist layer is larger than the diameter of the upper opening 25 at the lower surface of the interconnect layer 22. The material and thickness of the interconnect layer 24 may be the same as, for example, those of the interconnect layer 12.

The solder resist layer 25 is the outermost layer on the lower side of the interconnect substrate and is formed on the lower surface of the insulating layer 23 to cover the interconnect layer 24. The material and thickness of the solder resist layer 25 may be the same as, for example, the solder resist layer 15. The solder resist layer 25 has openings 25x, and part of the lower surface of the interconnect layer 24 is exposed in the openings 25x. The plane shape of each opening 25x may be, for example, circular. The interconnect layer 24 exposed in the openings 25x may be used as pads for electrical connection with a system board (not shown) such as a motherboard. According to need, the lower surface of the interconnect layer 24 exposed in the openings 25x may have a metal film as previously described formed thereon, or may be subjected to an antioxidant treatment such as OSP treatment.

Optical Waveguide

The optical waveguide 30 is formed on the solder resist layer 15 of the interconnect substrate 10. The optical waveguide 30 includes a first cladding layer 31, a core layer 32, a second cladding layer 33, a protrusion 35 for forming a first metal film, a protrusion 36 for forming a second metal film, a first metal film 351, and a second metal film 361.

The first cladding layer 31 is formed of, for example, a photosensitive material. Specifically, the first cladding layer 31 may be formed of a polymer such as, for example, a polyimide-based resin, an acrylic-based resin, an epoxy-based resin, a polyolefin-based resin, or a polynorbornene-based resin. The thickness of the first cladding layer 31 may be, for example, about 10 μm to 30 μm. The first cladding layer 31 is disposed on the interconnect substrate 10 such as to be approximately parallel to the interconnect substrate 10.

The core layer 32 is selectively formed on the upper surface of the first cladding layer 31. The core layer 32 covers part of the first metal film 351 and part of the second metal film 361. Although two elongated strips of the core layer 32 each extending in the X direction are disposed side by side on the top surface of the first cladding layer 31 in the example illustrated in FIG. 1, this is only an example. Only one strip of the core layer 32 may be formed, or three or more strips may be formed. The pitch of the strips of the core layer 32 arranged side by side may be, for example, about 200 μm to 300 μm. The core layer 32 may be formed of substantially the same material as the first cladding layer 31. The thickness of the core layer 32 may be, for example, about 15 μm to 35 μm. The shape of the transverse cross section of each strip of the core layer 32 may be, for example, square.

The second cladding layer 33 is formed on the upper surface of the first cladding layer 31 such as to cover at least the upper surface and side surfaces of the core layer 32. The second cladding layer 33 may be formed of substantially the same material as the first cladding layer 31. The thickness of the second cladding layer 33 may be, for example, about 10 μm to 30 μm.

The first cladding layer 31, the core layer 32 and the second cladding layer 33 may be formed of the same material as described above, but the refractive index of the core layer 32 is higher than the refractive indexes of the first cladding layer 31 and the second cladding layer 33. By including an additive for refractive index control such as Ge in the core layer 32, the refractive index of the core layer 32 is set higher than the refractive indexes of the first cladding layer 31 and the second cladding layer 33. The refractive indexes of the first cladding layer 31 and the second cladding layer 33 may be, for example, 1.5, and the refractive index of the core layer 32 may be, for example, 1.6.

The protrusion 35 for forming the first metal film is formed on the upper surface of the first cladding layer 31. The protrusion 35 for forming the first metal film has an upper surface 35a and an inclined surface 35b that is connected to the upper surface 35a at an angle to the upper surface 35a. The upper surface 35a of the protrusion 35 for forming the first metal film is parallel to the upper surface of the first cladding layer 31, for example. The angle between the upper surface of the first cladding layer 31 and the inclined surface 35b is, for example, 45 degrees. In addition to the upper surface 35a and the inclined surface 35b, the protrusion 35 for forming the first metal film may have a surface parallel to or perpendicular to the upper surface of the first cladding layer 31.

Figure 2:
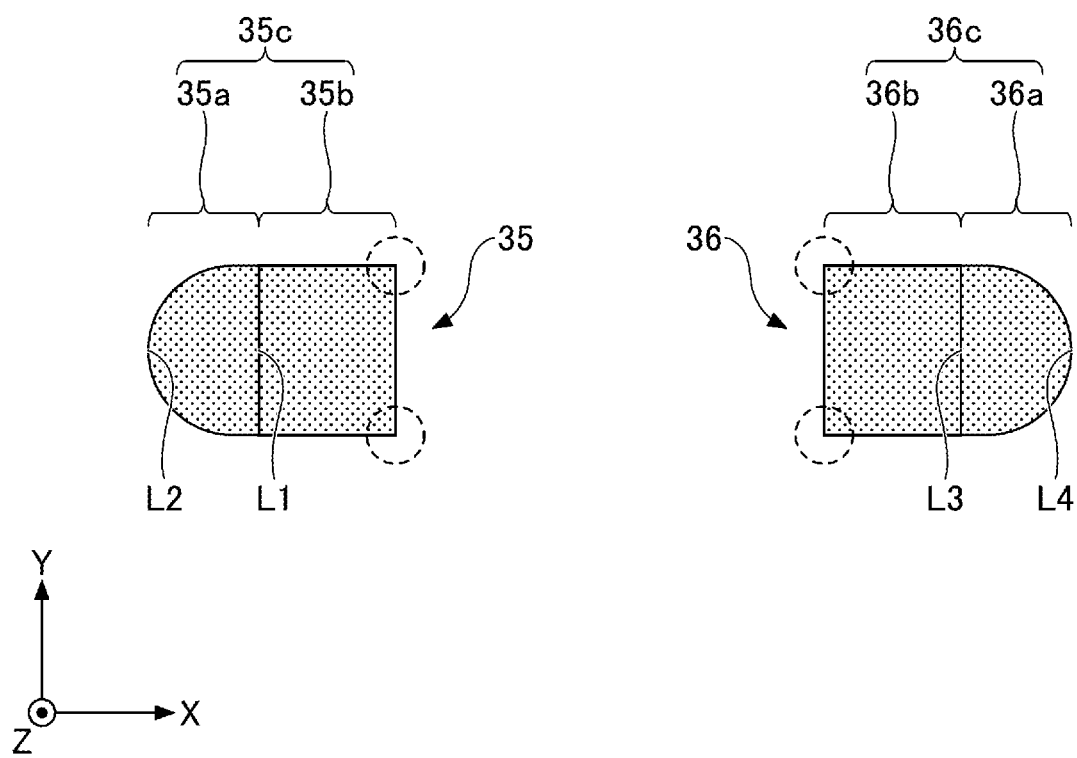
FIG. 2 is an enlarged plan view of a protrusion for forming a first metal film and a protrusion for forming a second metal film according to the first embodiment.

In a plan view illustrated in FIG. 2, the perimeter of a first region 35c constituted by the upper surface 35a and the inclined surface 35b of the protrusion 35 for forming the first metal film does not have a corner where two lines meet, except for the part where the inclined surface 35b meets the upper surface of the first cladding layer 31. It may be noted that the two points surrounded by dashed lines in the first region 35c are corners where two lines meet.

The upper surface 35a of the protrusion 35 for forming the first metal film is demarcated by, for example, a straight-line segment L1 that forms a boundary with the inclined surface 35b and a curved line segment L2 directly connected to both ends of the straight-line segment L1. The upper surface 35a of the protrusion 35 for forming the first metal film is, for example, semicircular. The upper surface 35a of the protrusion 35 for forming the first metal film may alternatively be semielliptical. The upper surface 35a of the protrusion 35 for forming the first metal film may have a shape other than semicircular and semielliptical, which is demarcated by the straight-line segment L1 and the curved line segment L2.

Returning to FIGS. 1A and 1B, the protrusion 36 for forming the second metal film is formed on the upper surface of the first cladding layer 31. The protrusion 36 for forming the second metal film has an upper surface 36a and an inclined surface 36b that is connected to the upper surface 36a at an angle to the upper surface 36a. The upper surface 36a of the protrusion 36 for forming the second metal film is parallel to the upper surface of the first cladding layer 31, for example. The angle between the upper surface of the first cladding layer 31 and the inclined surface 36b is, for example, 45 degrees. In addition to the upper surface 36a and the inclined surface 36b, the protrusion 36 for forming the second metal film may have a surface parallel to or perpendicular to the upper surface of the first cladding layer 31.

In the plan view illustrated in FIG. 2, the perimeter of a second region 36c constituted by the upper surface 36a and the inclined surface 36b of the protrusion 36 for forming the second metal film does not have a corner where two lines meet, except for the part where the inclined surface 36b meets the upper surface of the first cladding layer 31. It may be noted that the two points surrounded by dashed lines in the second region 36c are corners where two lines meet.

The upper surface 36a of the protrusion 36 for forming the second metal film is demarcated by, for example, a straight-line segment L3 forming a boundary with the inclined surface 36b and a curved line segment L4 directly connected to both ends of the straight-line segment L3. The upper surface 36a of the protrusion 36 for forming the second metal film is, for example, semicircular. The upper surface 36a of the protrusion 36 for forming the second metal film may alternatively be semielliptical. The upper surface 36a of the protrusion 36 for forming the second metal film may have a shape other than semicircular and semielliptical, which is demarcated by the straight-line segment L3 and the curved line segment L4. The upper surface 36a of the protrusion 36 for forming the second metal film may or may not have the same shape as the upper surface 35a of the protrusion 35 for forming the first metal film. Here, the definition of the term "same shape" includes a shape that coincides with the other when one is rotated by a predetermined angle.

Referring to FIG. 1 again, the first metal film 351 is formed at least on the inclined surface 35b of the protrusion 35 for forming the first metal film. At the inclined surface 35b, the first metal film 351 is situated at the center portion covered with the core layer 32, and extends beyond the core layer 32 to both sides thereof in the Y direction. The second metal film 361 is formed at least on the inclined surface 36b of the protrusion 36 for forming the second metal film. At the inclined surface 36b, the second metal film 361 is situated at the center portion covered with the core layer 32, and extends beyond the core layer 32 to both sides thereof in the Y direction.

The second metal film 361 formed at the inclined surface 36b is disposed in a generally opposing relationship to the first metal film 351 formed at the inclined surface 35b. The interface between the core layer 32 and the first metal film 351 and the interface between the core layer 32 and the second metal film 361 become reflection surfaces that change the direction of propagation of incident light. The first metal film 351 and the second metal film 361 are, for example, each a gold (Au) film with a thickness of 0.2 µm to 0.5 µm.

Method of Making Substrate with Optical Waveguide

In the following, a method of making the substrate 1 with optical waveguides will be described. FIGS. 3A through 3C to FIGS. 9A and 9B illustrate an example of the method of making the substrate with optical waveguides according to the first embodiment. FIG. 4A, FIG. 5A, FIG. 6A, and FIG. 8A are cross-sectional views, and FIG. 4B, FIG. 5B, FIG. 6B, and FIG. 8B are plan views.

Figure 3A:
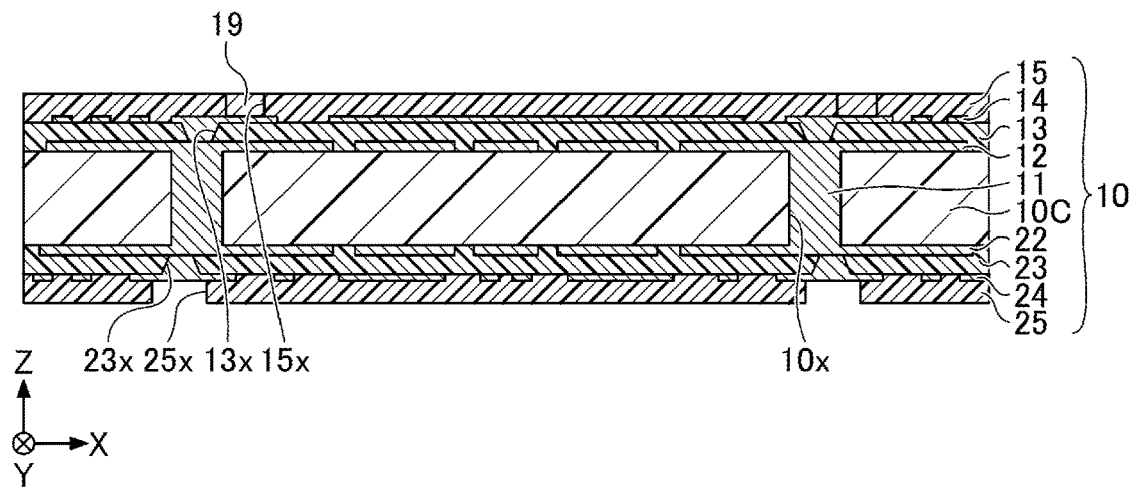
FIGS. 3A through 3C are drawings illustrating an example of a method of making the substrate with optical waveguides according to the first embodiment.

In the step illustrated in FIG. 3A, an interconnect substrate 10 is prepared. The interconnect substrate 10 may be manufactured by, for example, a build-up method known in the art. The interconnect substrate 10 may be a commercially purchased product.

Figure 3B:
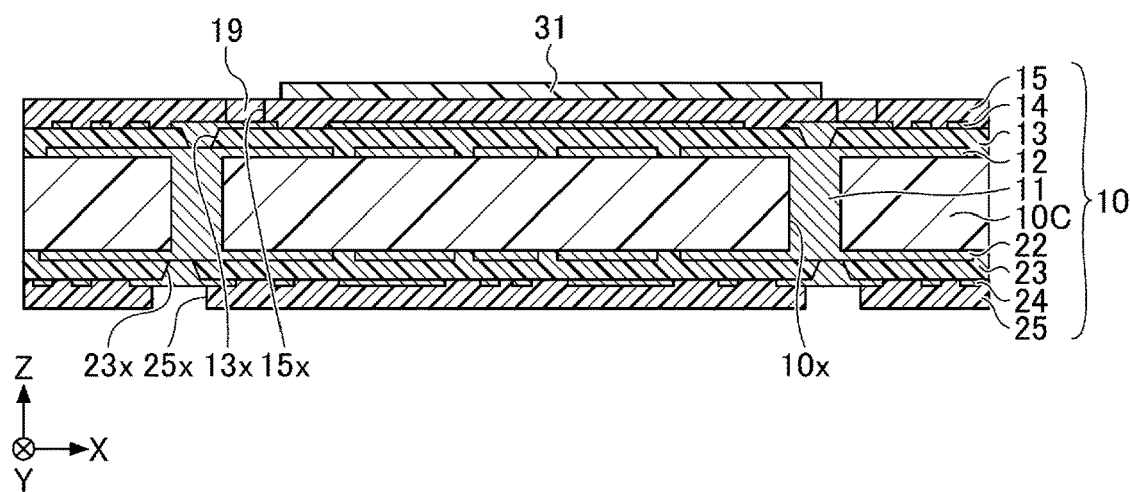
Figure 3C:
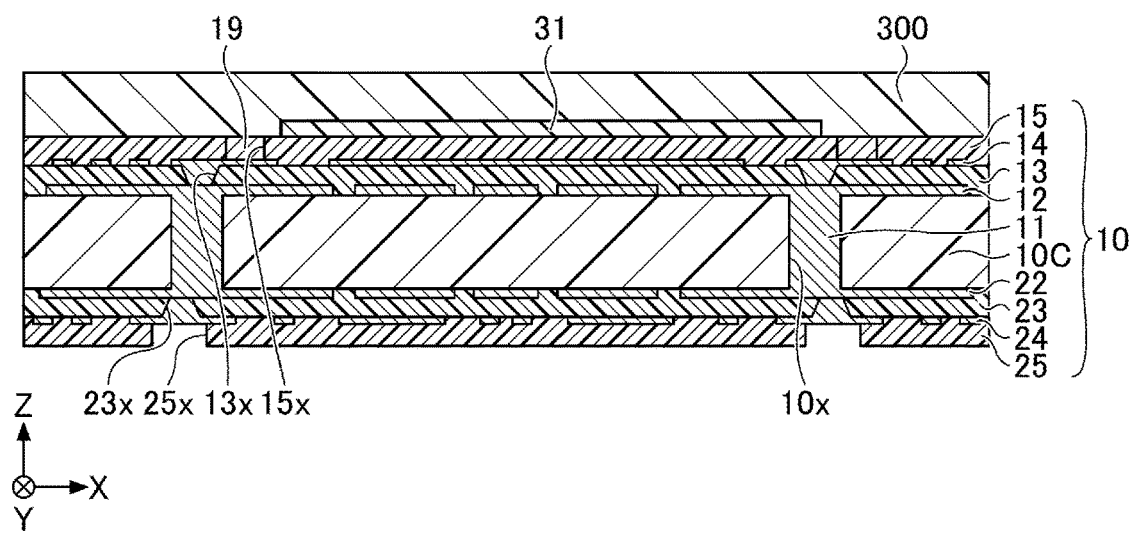

In the step illustrated in FIG. 3B, a first cladding layer 31 is formed on the upper surface of the solder resist layer 15 of the interconnect substrate 10. The thickness of the first cladding layer 31 is, for example, about 10 µm. In the step illustrated in FIG. 3C, an ultraviolet-curable resin 300 covering the first cladding layer 31 is laminated on the upper surface of the solder resist layer 15 of the interconnect substrate 10. The thickness of the ultraviolet-curable resin 300 is, for example, about 35 µm.

In the steps illustrated in FIG. 4A through FIG. 6B, the ultraviolet-curable resin 300 is patterned such that only remaining portions thereof are the portions that are to become the protrusion 35 for forming the first metal film and the protrusion 36 for forming the second metal film, which results in the formation of resin protrusions 350 and 360.

Figure 4A:
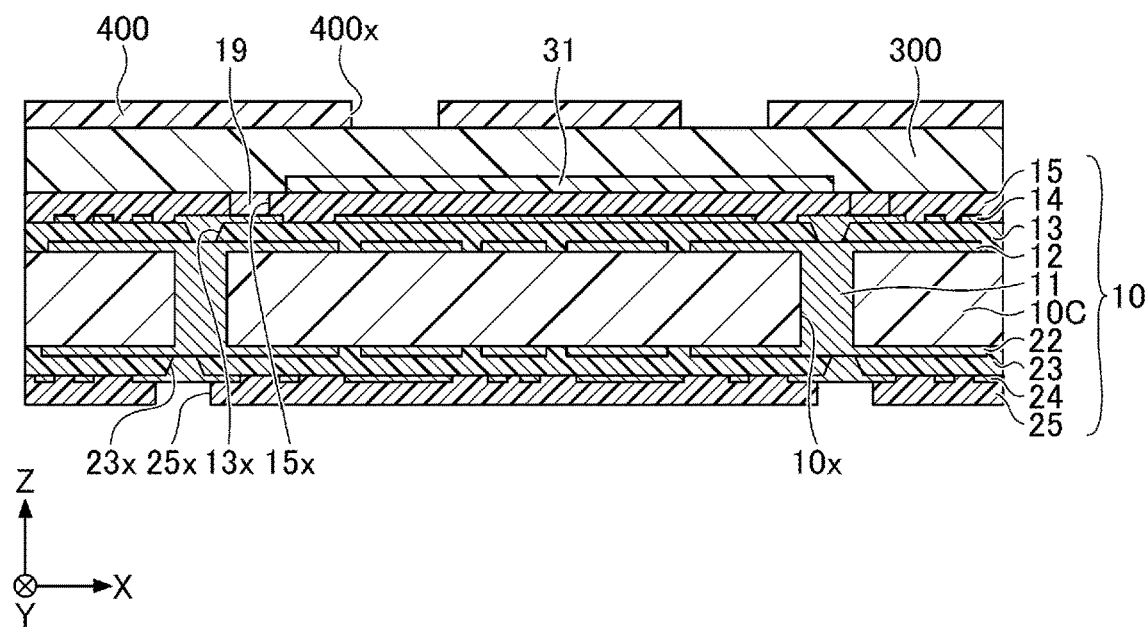
FIGS. 4A and 4B are drawings illustrating an example of the method of making the substrate with optical waveguides according to the first embodiment.
Figure 4B:
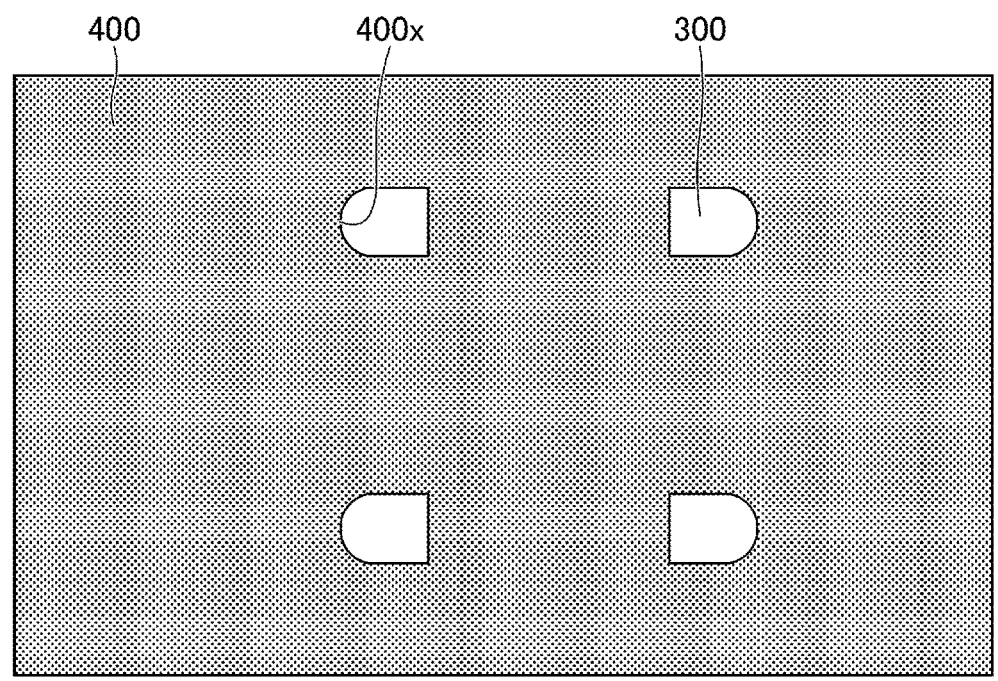

Specifically, as illustrated in FIG. 4A and FIG. 4B, a mask 400, for example, is disposed on the ultraviolet-curable resin 300, and has openings 400x at positions corresponding to the portions that are to become the protrusion 35 for forming the first metal film and the protrusion 36 for forming the second metal film. In the plan view, the openings 400x correspond in shape to the protrusion 35 for forming the first metal film and the protrusion 36 for forming the second metal film illustrated in FIG. 1.

Figure 5A:
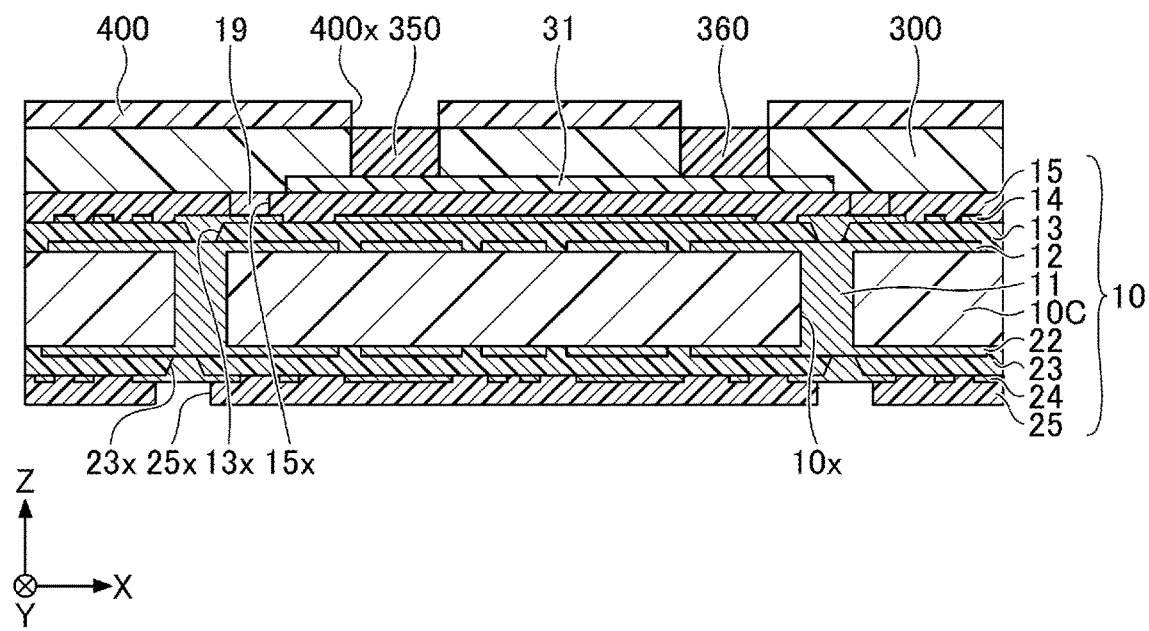
FIGS. 5A and 5B are drawings illustrating an example of the method of making the substrate with optical waveguides according to the first embodiment.
Figure 5B:
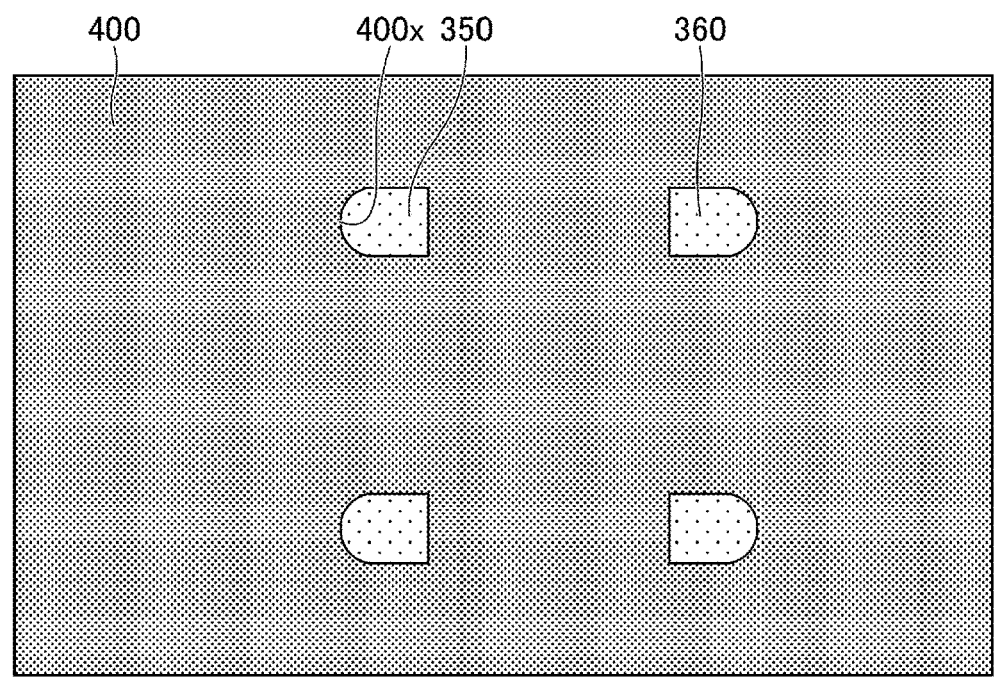
Figure 6A:
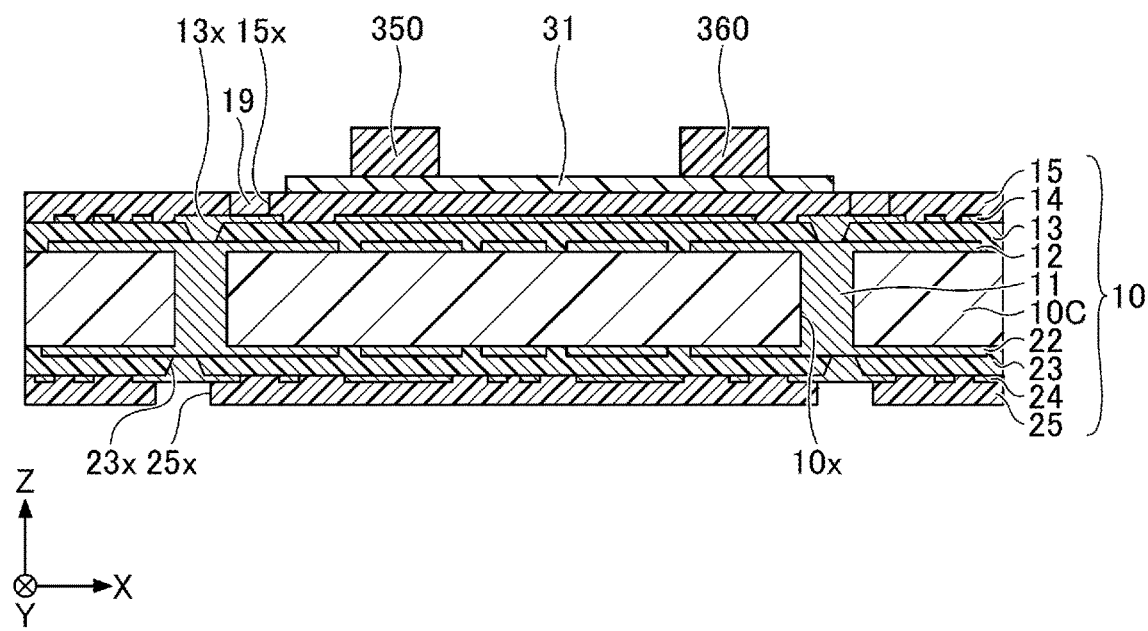
FIGS. 6A and 6B are drawings illustrating an example of the method of making the substrate with optical waveguides according to the first embodiment.
Figure 6B:
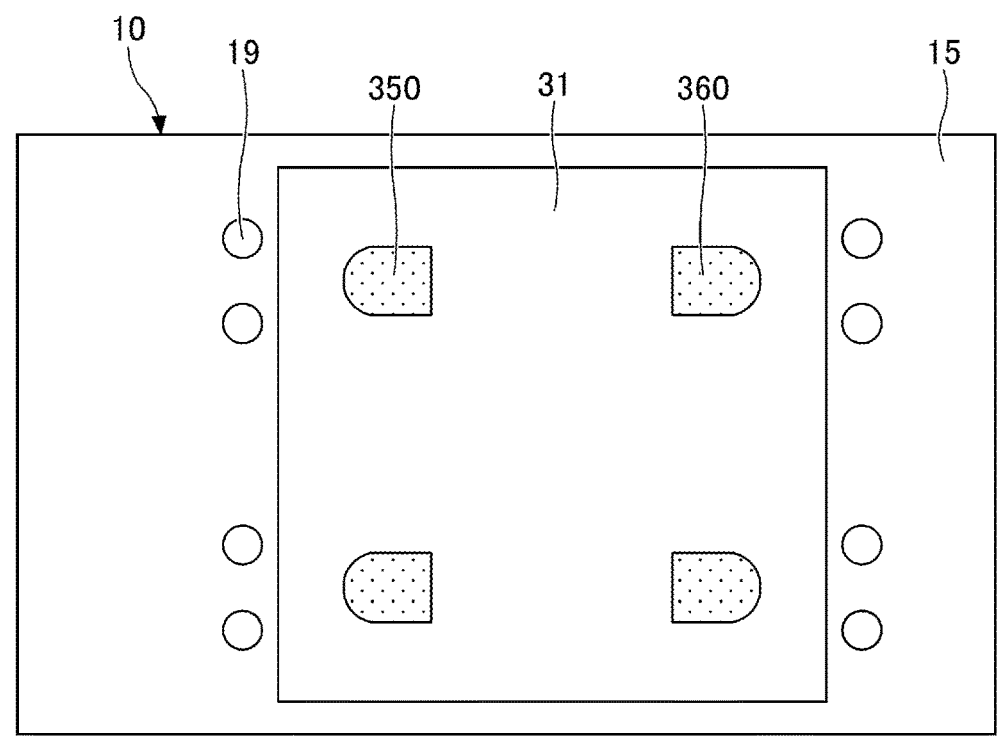

Subsequently, as illustrated in FIG. 5A and FIG. 5B, the ultraviolet-curable resin 300 is exposed to ultraviolet light through the mask 400 and patterned by the exposure. The portions of the ultraviolet-curable resin 300 exposed through the openings 400x are cured and become the resin protrusions 350 and 360. The unnecessary portion of the ultraviolet-curable resin 300 is then removed by development to form the resin protrusions 350 and 360 as illustrated in FIG. 6A and FIG. 6B.

Figure 7A:
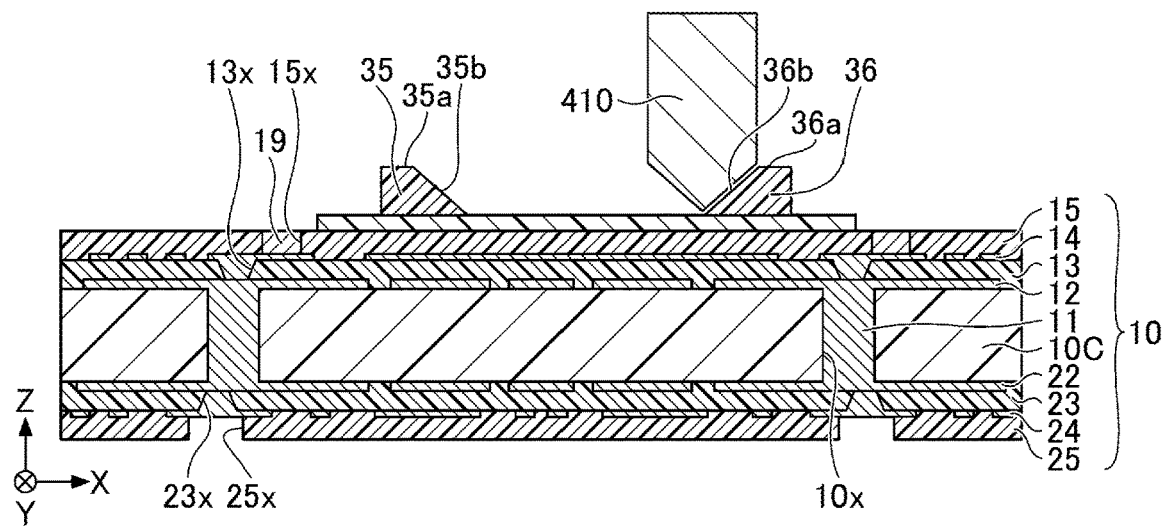
FIGS. 7A through 7C are drawings illustrating an example of the method of making the substrate with optical waveguides according to the first embodiment.

In the step illustrated in FIG. 7A, the resin protrusions 350 and 360 are cut to, for example, 45 degrees so that the inclined surfaces are in a generally opposing relationship to each other. Cutting may be performed by, for example, dicing with a dicer blade 410 and/or polishing with a polishing plate. When scratches, dents, or the like are made in the inclined surfaces 35b and 36b made by the cutting process, it is preferable to smooth the inclined surfaces 35b and 36b by irradiating the cut surfaces with a laser beam or applying a resin solution to the cut surfaces. Through these steps, the protrusion 35 for forming the first metal film is formed with the inclined surface 35b sloping relative to the upper surface of the first cladding layer 31, and the protrusion 36 for forming the second metal film is formed with the inclined surface 36b sloping relative to the upper surface of the first cladding layer 31.

In the steps illustrated in FIG. 7B to FIG. 8B, a first metal film 351 is formed on at least the inclined surface 35b of the protrusion 35 for forming the first metal film, and a second metal film 361 is formed on at least the inclined surface 36b of the protrusion 36 for forming the second metal film.

Figure 7B:
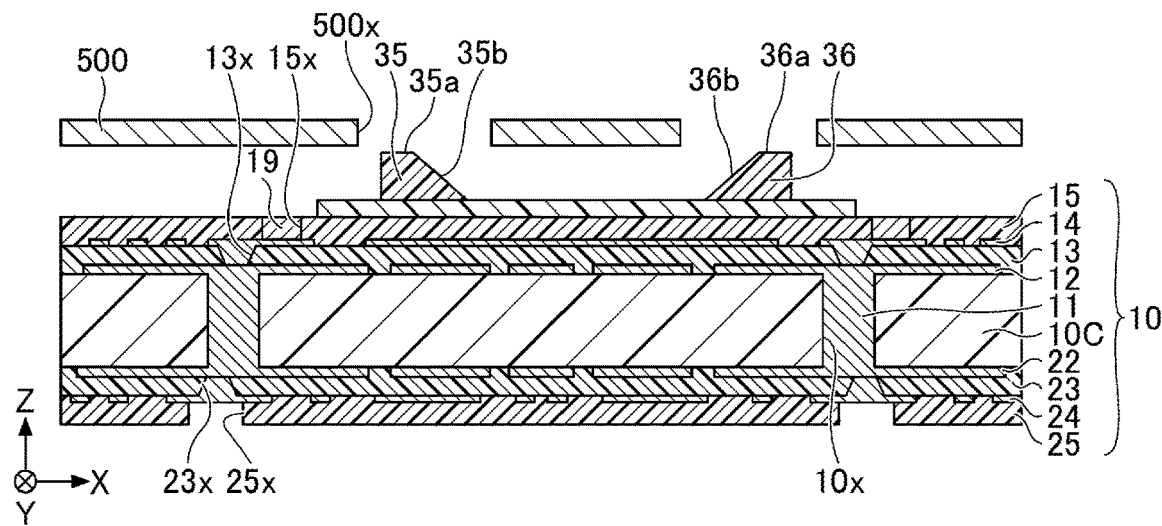

Specifically, as illustrated in FIG. 7B, a mask 500 is placed above the protrusion 35 for forming the first metal film and the protrusion 36 for forming the second metal film, and has openings 500x at the positions where the first metal film 351 and the second metal film 361 are to be formed. The mask 500 may be, for example, made of metal. The openings 500x in the plan view may have any shape, such as circular or rectangular, as long as the positions where the first metal film 351 and the second metal film 361 are to be formed are exposed.

Figure 7C:
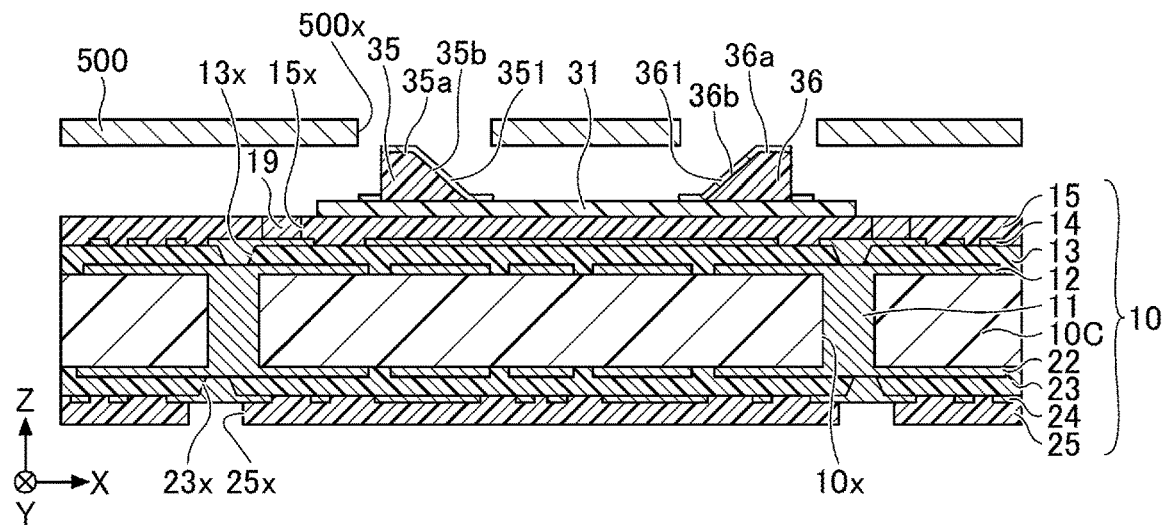

As illustrated in FIG. 7C, the first metal film 351 and the second metal film 361 are formed on at least the inclined surface 35b and the inclined surface 36b, respectively, exposed in the opening 500x by sputtering or vapor deposition performed through the mask 500. The first metal film 351 and the second metal film 361 are, for example, gold films. Part of the first metal film 351 and part of the second metal film 361 may be formed on the upper surface of both the protrusion 35 for forming the first metal film and the protrusion 36 for forming the second metal film and also on the upper surface of the first cladding layer 31.

Figure 8A:
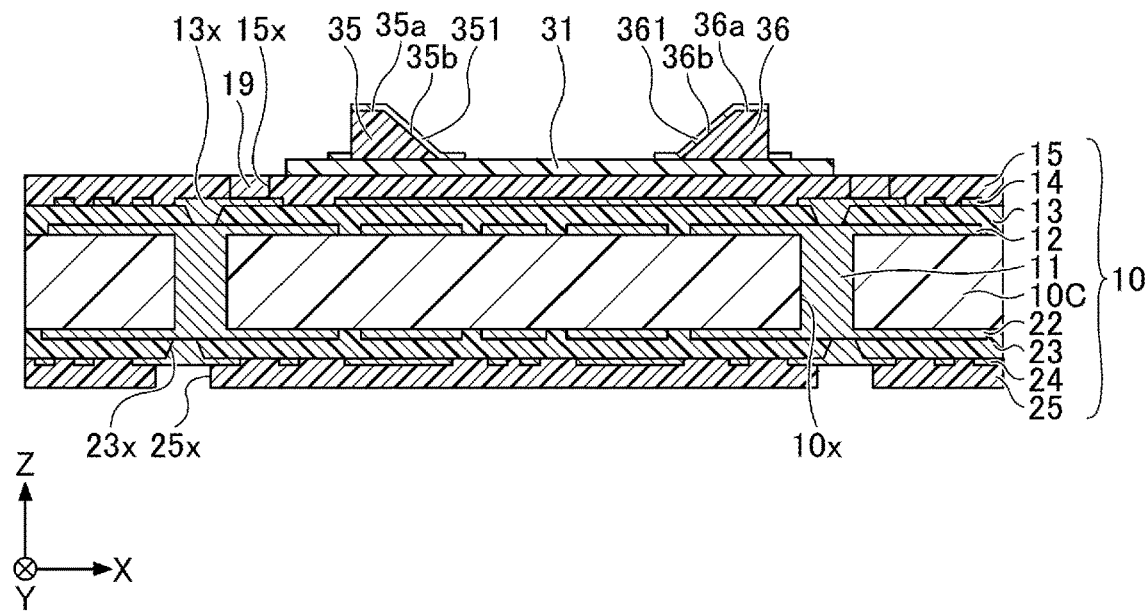
FIGS. 8A and 8B are drawings illustrating an example of the method of making the substrate with optical waveguides according to the first embodiment.
Figure 8B:
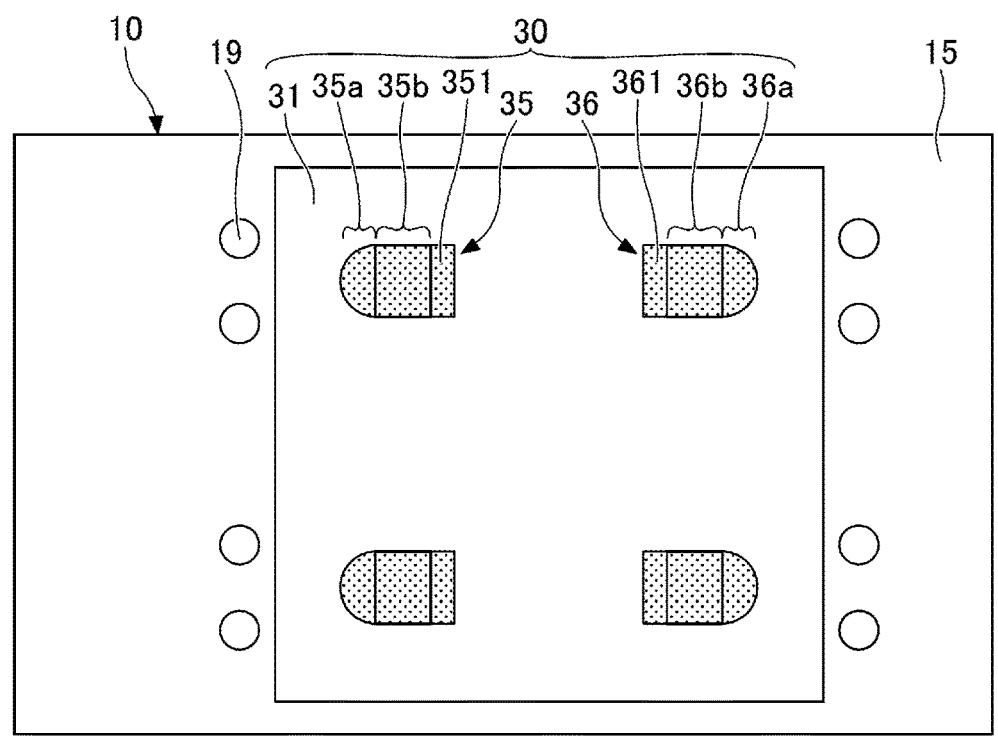

As illustrated in FIG. 8A and FIG. 8B, the mask 500 is removed. Although two sets of protrusions, each set including the protrusion 35 for forming the first metal film and the protrusion 36 for forming the second metal film, are formed in this example, this is non-limiting. Only one set of protrusions, including the protrusion 35 for forming the first metal film and the protrusion 36 for forming the second metal film, may be formed, or three or more sets may be formed.

Figure 9A:
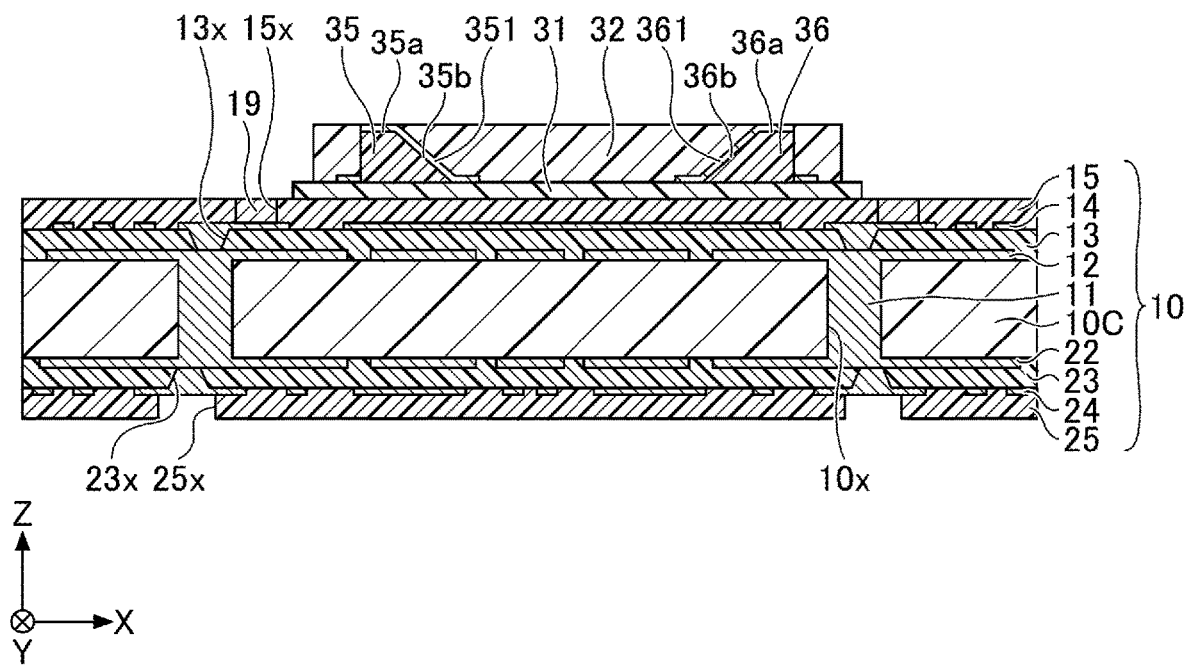
FIGS. 9A and 9B are drawings illustrating an example of the method of making the substrate with optical waveguides according to the first embodiment.

In the step illustrated in FIG. 9A, a core layer 32 made of a photosensitive resin is formed on the upper surface of the first cladding layer 31 such as to cover part of the first metal film 351 and part of the second metal film 361. The core layer 32 is formed, for example, by placing an uncured photosensitive resin film on the first cladding layer 31 and performing exposure and development through the same mask. The upper surface of the core layer 32 is flush with, for example, the upper surfaces of the first metal film 351 and the second metal film 361. The upper surfaces of the first metal film 351 and the second metal film 361 may be exposed outside the core layer 32. In the illustrated example, two elongated strips of the core layer 32 extending in the X direction are formed on the upper surface of the first cladding layer 31. In general, strips of the core layer 32 are formed such as to correspond in number to the sets of the protrusions, each set including the protrusion 35 for forming the first metal film and the protrusion 36 for forming the second metal film.

Figure 9B:
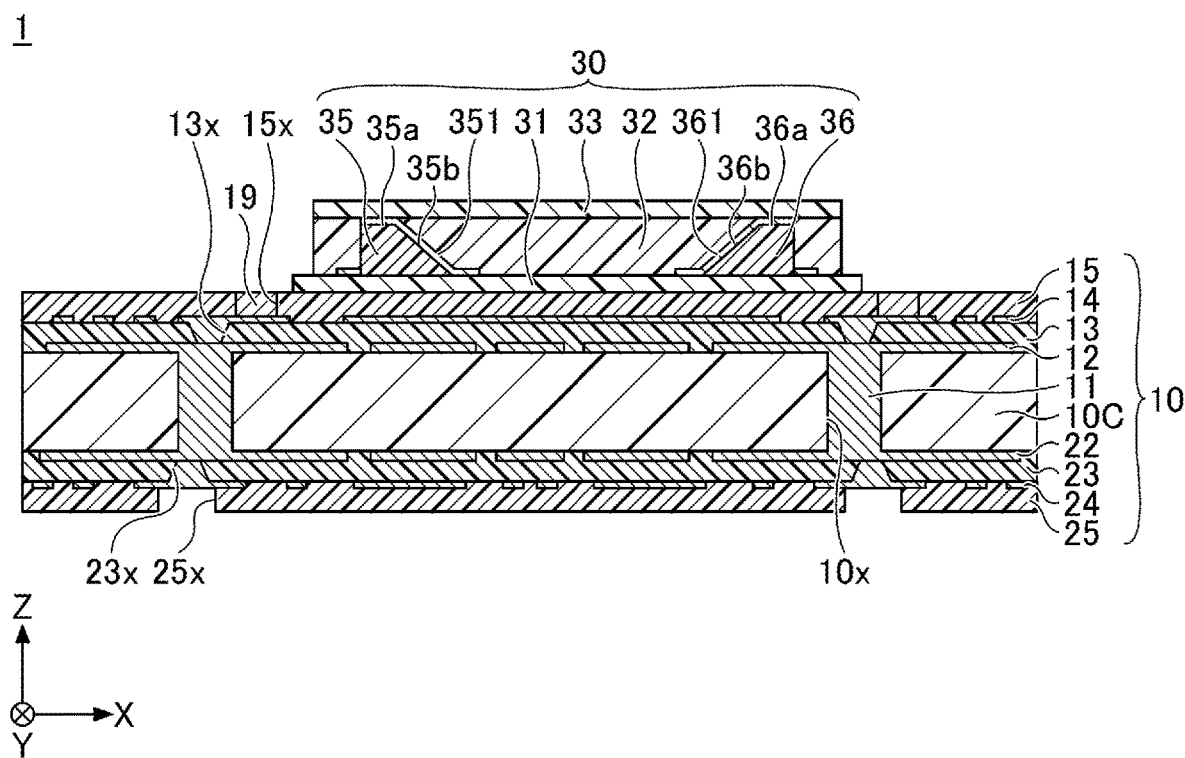

In the step illustrated in FIG. 9B, a second cladding layer 33 is laminated on the core layer 32. The second cladding layer 33 may be formed into a predetermined pattern by, for example, placing an uncured photosensitive resin film on the upper surface of the first cladding layer 31 such as to cover at least the upper surface and side surfaces of the core layer 32, and then exposing and developing the photosensitive resin film. Through the steps described heretofore, the substrate 1 with optical waveguides in which the optical waveguides 30 are mounted on the interconnect substrate 10 are completed in final form.

As was previously described, the substrate 1 with optical waveguides is configured such that in the plan view, the perimeter of the first region 35c constituted by the upper surface 35a and the inclined surface 35b of the protrusion 35 for forming the first metal film does not have a corner where two lines meet except for the part where the inclined surface 35b comes in contact with the upper surface of the first cladding layer 31. In the plan view, the perimeter of the second region 36c constituted by the upper surface 36a and the inclined surface 36b of the protrusion 36 for forming the second metal film does not have a corner where the two lines meet, except for the part where the inclined surface 36b comes in contact with the upper surface of the first cladding layer 31.

If the protrusion 35 for forming the first metal film and the protrusion 36 for forming the second metal film were rectangular in the plan view, the protrusion 35 for forming the first metal film and the protrusion 36 for forming the second metal film would have substantially right-angle corners where two lines meet in the plan view on the opposite side from the inclined surfaces. In this case, if the mask 500 placed above the protrusion 35 for forming the first metal film and the protrusion 36 for forming the second metal film in the step illustrated in FIG. 7B were to come into contact with the protrusion 35 for forming the first metal film and the protrusion 36 for forming the second metal film, the material at the corners would be likely to be damaged. In the case of the substrate 1 with optical waveguides, the protrusion 35 for forming the first metal film and the protrusion 36 for forming the second metal film do not have a corner where two lines meet in the plan view on the opposite side from the inclined surfaces, so that the risk of breakage is greatly reduced even if contact with the mask 500 occurs. That is, the curved line segments L2 and L4 of the protrusion 35 for forming the first metal film and the protrusion 36 for forming the second metal film have shapes that are not easily broken even if contact with the mask 500 occurs.

This embodiment is directed to the configuration in which both the protrusion 35 for forming the first metal film and the protrusion 36 for forming the second metal film are provided. Alternatively, the configuration may be such that only one of the protrusion 35 for forming the first metal film and the protrusion 36 for forming the second metal film is provided.

Variation of First Embodiment

A variation of the first embodiment is directed to another example of the plane shape of the first and second regions. With respect to the variation of the first embodiment, a description of the same components as those in the previously described embodiment may be omitted.

Figure 10:
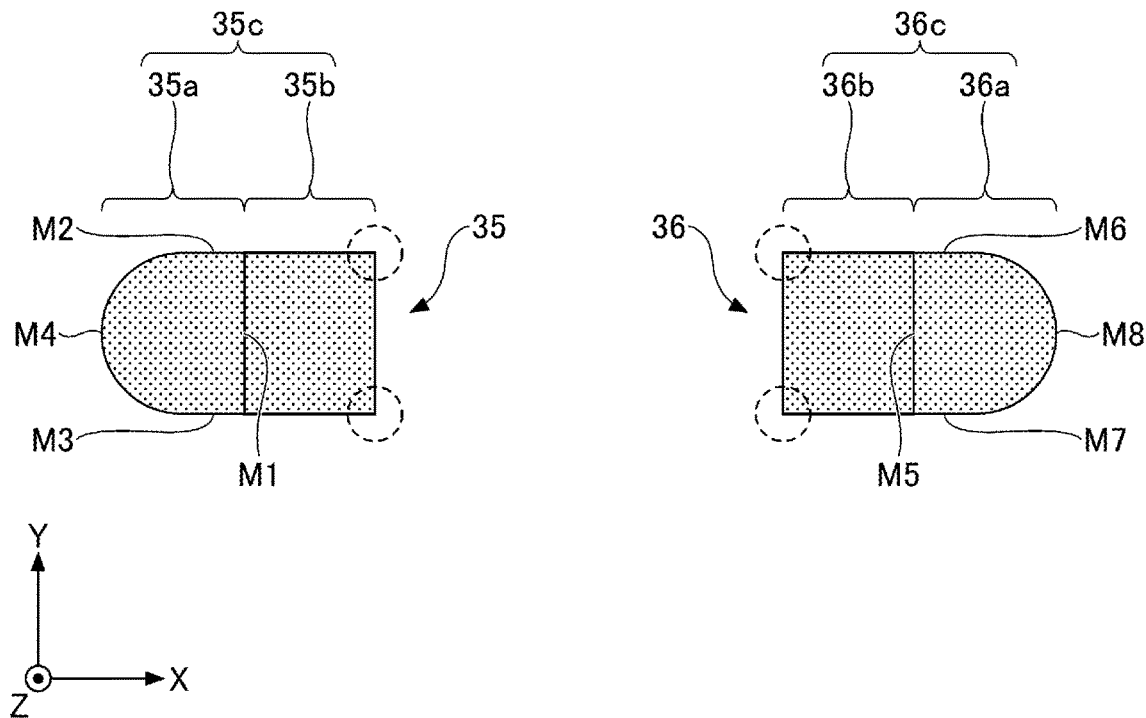
FIG. 10 is an enlarged plan view of the protrusion for forming a first metal film and the protrusion for forming a second metal film according to a variation of the first embodiment.

FIG. 10 is an enlarged plan view of the protrusion for forming a first metal film and the protrusion for forming a second metal film according to the variation of the first embodiment. The first region 35c and the second region 36c may be shaped as illustrated in FIG. 10.

In the plan view illustrated in FIG. 10 also, the first region 35c constituted by the upper surface 35a and the inclined surface 35b of the protrusion 35 for forming the first metal film does not have a corner where the two lines meet, except for the part where the inclined surface 35b meets the upper surface of the first cladding layer 31. In the plan view, the second region 36c constituted by the upper surface 36a and the inclined surface 36b of the protrusion 36 for forming the second metal film does not have a corner where the two lines meet, except for the part where the inclined surface 36b meets the upper surface of the first cladding layer 31.

In FIG. 10, the upper surface 35a of the protrusion 35 for forming the first metal film is demarcated by, for example, a straight-line segment M1 forming a boundary with the inclined surface 35b, a straight-line segment M2 connected to one end of the straight-line segment M1, a straight-line segment M3 connected to the other end of the straight-line segment M1, and a curved line segment M4 connecting the ends of the straight-line segments M2 and M3.

Further, the upper surface 36a of the protrusion 36 for forming the second metal film is demarcated by, for example, a straight-line segment M5 forming a boundary with the inclined surface 36b, a straight-line segment M6 connected to one end of the straight-line segment M5, a straight-line segment M7 connected to the other end of the straight-line segment M5, and a curved line segment M8 connecting the ends of the straight-line segments M6 and M7.

As described above, the upper surface 35a of the protrusion 35 for forming the first metal film may be demarcated by the straight-line segment M1 forming a boundary with the inclined surface 35b, the curved line segment M4 connected via other straight-line segments to the opposite ends of the straight-line segment M1, and the noted straight-line segments. Further, the upper surface 36a of the protrusion 36 for forming the second metal film may be demarcated by the straight-line segment M5 forming a boundary with the inclined surface 36b, the curved line segment M8 connected via other straight-line segments to the opposite ends of the straight-line segment M5, and the noted straight-line segments. The upper surface 35a of the protrusion 35 for forming the first metal film and the upper surface 36a of the protrusion 36 for forming the second metal film may include a semicircular part or a semielliptical part.

Figure 11:
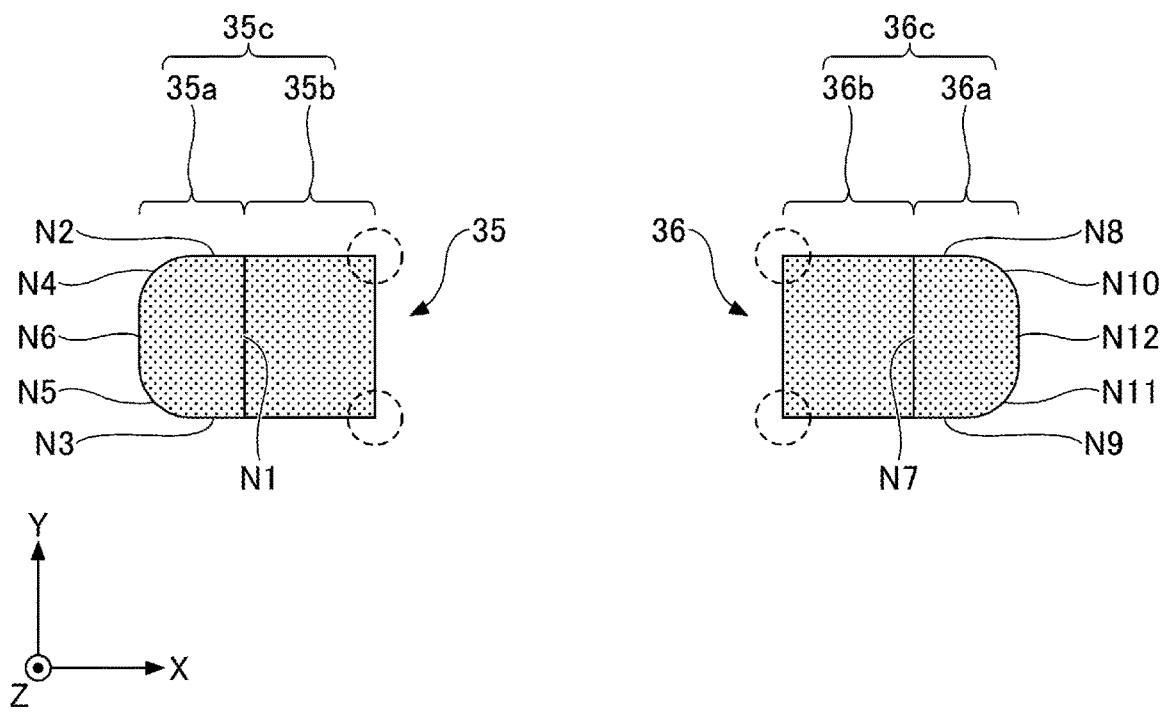
FIG. 11 is an enlarged plan view of the protrusion for forming a first metal film and the protrusion for forming a second metal film according to another variation of the first embodiment.

FIG. 11 is an enlarged plan view of the protrusion for forming a first metal film and the protrusion for forming a second metal film according to another variation of the first embodiment. The first region 35c and the second region 36c may be shaped as illustrated in FIG. 11.

In the plan view illustrated in FIG. 11 also, the first region 35c constituted by the upper surface 35a and the inclined surface 35b of the protrusion 35 for forming the first metal film does not have a corner where the two lines meet, except for the part where the inclined surface 35b meet the upper surface of the first cladding layer 31. In the plan view, the second region 36c constituted by the upper surface 36a and the inclined surface 36b of the protrusion 36 for forming the second metal film does not have a corner where the two lines meet, except for the part where the inclined surface 36b meets the upper surface of the first cladding layer 31.

In FIG. 11, the upper surface 35a of the protrusion 35 for forming the first metal film is demarcated by a straight-line segment N1 forming a boundary with the inclined surface 35b, a curved line segment N4 connected via a straight-line segment N2 to one end of the straight-line segment N1, a curved line segment N5 connected via a straight-line segment N3 to the other end of the straight-line segment N1, and a straight-line segment N6 connecting the ends of the curved line segments N4 and N5. The straight-line segments N1 and N6 may or may not be parallel to each other. The curved line segments N4 and N5 may or may not be arc-shaped. As an alternative configuration, the curved line segment N4 may be directly connected to one end of the straight-line segment N1 without the intervening straight-line segment N2, and the curved line segment N5 may be directly connected to the other end of the straight-line segment N1 without the intervening straight-line segment N3.

The upper surface 36a of the protrusion 36 for forming the second metal film is demarcated by a straight-line segment N7 forming a boundary with the inclined surface 36b, a curved line segment N10 connected via a straight-line segment N8 to one end of the straight-line segment N7, a curved line segment N11 connected via a straight-line segment N9 to the other end of the straight-line segment N7, and a straight-line segment N12 connecting the ends of the curved line segments N10 and N11. The straight-line segments N7 and N12 may or may not be parallel to each other. The curved line segments N10 and N11 may or may not be arc-shaped. As an alternative configuration, the curved line segment N10 may be directly connected to one end of the straight-line segment N7 without the intervening straight-line segment N8, and the curved line segment N11 may be directly connected to the other end of the straight-line segment N7 without the intervening straight-line segment N9.

As in the case of the structure illustrated in FIG. 2, the structures illustrated in FIG. 10 and FIG. 11 are such that the protrusion 35 for forming the first metal film and the protrusion 36 for forming the second metal film do not have a corner where two lines meet in plan view on the opposite sides from the inclined surfaces, which results in the risk of breakage being greatly reduced even if contact with the mask 500 occurs. It may be noted that each of the upper surfaces of the protrusion 35 for forming the first metal film and the protrusion 36 for forming the second metal film more preferably has a perimeter that is free of any straight-line part in the plan view, except for the boundary with the inclined surface, and constituted only by curved line parts as illustrated in FIG. 2, for example. Such a configuration provides the highest strength.

Second Embodiment

The second embodiment is directed to an example of an optical communication device that includes a substrate on which an optical waveguide is mounted according to the first embodiment, and that includes either a light emitting device emitting light to the optical waveguide or a light receiving device that receives light emitted from the optical waveguide, or both, mounted on the substrate. In the second embodiment, a description of the same components as those described in the previous embodiments may be omitted.

Figure 12:
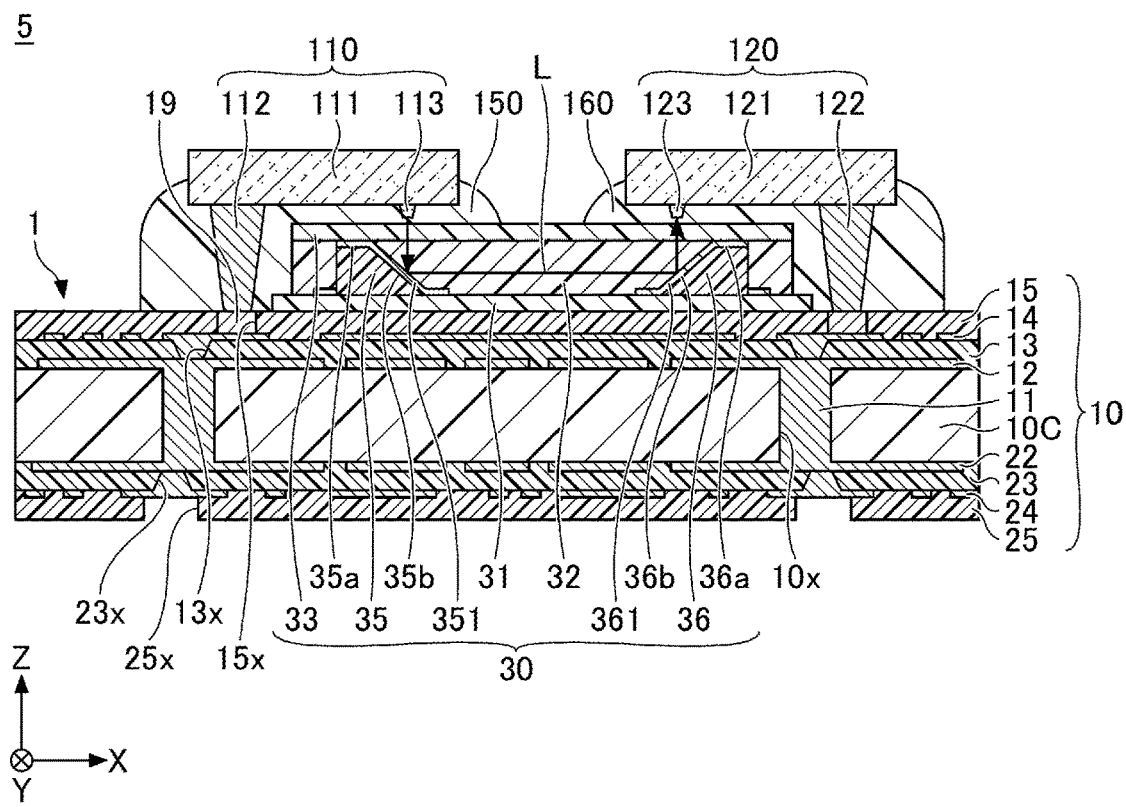
FIG. 12 is a cross-sectional view illustrating an example of an optical transceiver according to a second embodiment.

FIG. 12 is a cross-sectional view illustrating an example of an optical transceiver according to the second embodiment. As illustrated in FIG. 12, an optical transceiver 5 includes a substrate 1 with an optical waveguide, a light emitting device 110, a light receiving device 120, and underfill resins 150 and 160.

The light emitting device 110 includes a main part 111, a bump 112, and a light emitting part 113, and emits light to the optical waveguide 30. The bump 112 and the light emitting part 113 are disposed on the same side of the main part 111 as the interconnect substrate 10. The bump 112 is, for example, an Au bump and is electrically connected to the external connection terminal 19 of the interconnect substrate 10. The light emitting part 113 is arranged at such a position as to emit light to the first metal film 351. The light emitting device 110 may be, for example, a surface emitting laser (VCSEL: vertical cavity surface emitting laser), a light emitting diode (LED), or the like.

The underfill resin 150 is provided between the light emitting device 110 and part of both the solder resist layer 15 and the optical waveguide 30. The underfill resin 150 may be, for example, a light transmissive resin capable of transmitting light emitted from the light emitting device 110.

The light receiving device 120 includes a main part 121, a bump 122, and a light receiving part 123, and receives light emitted from the optical waveguide 30. The bump 122 and the light receiving part 123 are disposed on the same side of the main part 121 as the interconnect substrate 10. The bump 122 is, for example, an Au bump and is electrically connected to the external connection terminal 19 of the interconnect substrate 10. The light receiving part 123 is arranged at such a position as to receive light reflected by the second metal film 361. The light receiving device 120 may be, for example, a photodiode or an avalanche photodiode (APD).

The underfill resin 160 is provided between the light receiving device 120 and part of both the solder resist layer 15 and the optical waveguide 30. The underfill resin 160 may be, for example, a light transmissive resin capable of transmitting light that is to be received by the light receiving device 120.

In FIG. 12, light L emitted from the light emitting part 113 of the light emitting device 110 passes through the underfill resin 150 and the second cladding layer 33 to enter the core layer 32, and reaches the first metal film 351 to be totally reflected by the first metal film 351, which results in an approximately 90-degree change in the light propagation direction. The light L then propagates in the core layer 32, and reaches the second metal film 361 to be totally reflected by the second metal film 361, which results in an approximately 90-degree change in the light propagation direction. The light L then exits from the core layer 32 to pass through the second cladding layer 33 and the underfill resin 160, and is received by the light receiving part 123 of the light receiving device 120.

Since the optical transceiver 5 has the optical waveguide 30 in which the protrusions for forming a metal film have such shape as to be unlikely to break, a highly reliable device may be realized.

Figure 13:
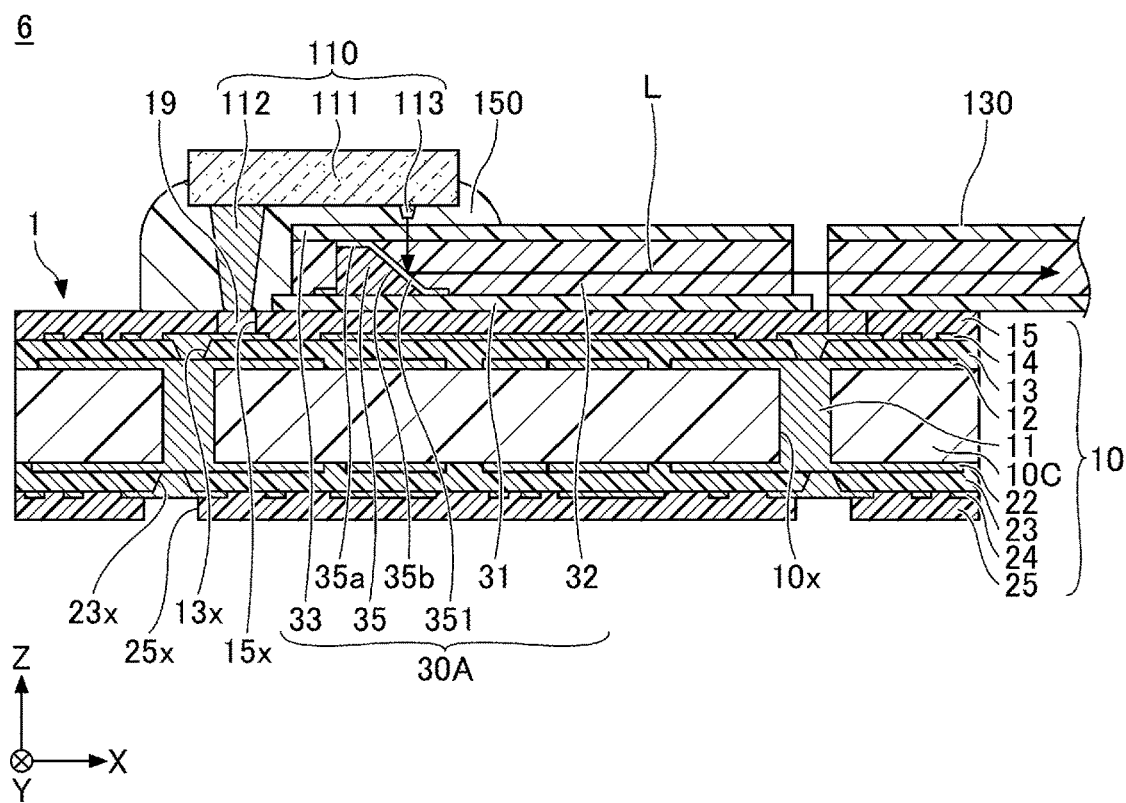
FIG. 13 is a cross-sectional view illustrating an example of an optical transceiver according to a variation of the second embodiment. Form for carrying out invention

FIG. 13 is a cross-sectional view illustrating an example of an optical transceiver according to a variation of the second embodiment. As illustrated in FIG. 13, an optical transceiver 6 differs from the optical transceiver 5 (see FIG. 12) in that the optical waveguide 30 is replaced with an optical waveguide 30A, and an optical fiber 130 for signal transmission is provided in place of the light receiving device 120.

The optical waveguide 30A differs from the optical waveguide 30 in that the protrusion 36 for forming the second metal film and the second metal film 361 are not provided. The optical fiber 130 is arranged on the solder resist layer 15 of the interconnect substrate 10 such that the incident surface of the optical fiber 130 and the end surface of the optical waveguide 30A on the far side from the first metal film 351 face each other across a small gap. The optical axis of the optical fiber 130 coincides with the optical axis of the optical waveguide 30A.

Light L perpendicularly incident on the optical waveguide 30A from the light emitting part 113 of the light emitting device 110 is reflected by the first metal film 351 at an angle of 90 degrees, and passes through the core layer 32 of the optical waveguide 30A, followed by exiting from the end face of the optical waveguide 30A to enter the optical fiber 130, thereby being transmitted as an optical signal. As an alternative configuration, the light emitting device 110 may be replaced with a light receiving device, and light exiting from the optical fiber 130 enters the optical waveguide 30A, followed by being reflected by the first metal film 351 at an angle of 90 degrees and then received by the light receiving device.

Since the optical transceiver 6 has the optical waveguide 30A in which the protrusion for forming a metal film has such shape as to be unlikely to break, a highly reliable device may be realized.

According to at least one embodiment, a substrate having an optical waveguide is provided for which the optical waveguide has a protrusion for forming a metal film that has such shape as to be unlikely to break.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A substrate with optical waveguide, comprising:
   an interconnect substrate; and
   an optical waveguide formed on the interconnect substrate,
   wherein the optical waveguide includes
   a first cladding layer,
   a first protrusion formed on an upper surface of the first cladding layer, the first protrusion having an upper surface and an inclined surface, the inclined surface being connected to the upper surface of the first protrusion, the inclined surface sloping relative to the upper surface of the first protrusion,
   a first metal film formed at least on the inclined surface of the first protrusion,
   a core layer formed on the upper surface of the first cladding layer such as to cover part of the first metal film, and
   a second cladding layer formed on the upper surface of the first cladding layer such as to cover at least an upper surface and side surfaces of the core layer,
   wherein in plan view, a perimeter of a first surface region constituted by both the upper surface and the inclined surface of the first protrusion does not have a corner where two lines meet, except for a part thereof where the inclined surface meets the upper surface of the first cladding layer.

2. The substrate with optical waveguide as claimed in claim 1, wherein the upper surface of the first protrusion is demarcated by line segments, the line segments including at least both a straight-line segment forming a boundary with the inclined surface and a curved line segment connected to both ends of the straight-line segment directly or through other straight-line segments.

3. The substrate with optical waveguide as claimed in claim 2, wherein the upper surface of the first protrusion includes a semicircular part.

4. The substrate with optical waveguide as claimed in claim 2, wherein the upper surface of the first protrusion includes a semielliptical part.

5. The substrate with optical waveguide as claimed in claim 1, wherein the upper surface of the first protrusion is demarcated by line segments, the line segments including a first straight-line segment forming a boundary with the inclined surface, a first curved line segment connected to one end of the first straight-line segment directly or through another straight-line segment, a second curved line segment connected to another end of the first straight-line segment directly or through another straight-line segment, and a second straight-line segment connecting an end of the first curved line segment and an end of the second curved line segment.

6. The substrate with optical waveguide as claimed in claim 1, further comprising:
   a second protrusion formed on the upper surface of the first cladding layer, the second protrusion having an upper surface and an inclined surface, the inclined surface of the second protrusion being connected to the upper surface of the second protrusion, the inclined surface of the second protrusion sloping relative to the upper surface of the second protrusion; and
   a second metal film formed at least on the inclined surface of the second protrusion,
   wherein in plan view, a perimeter of a second surface region constituted by the upper surface and the inclined surface of the second protrusion does not have a corner where two lines meet, except for a part thereof where the inclined surface of the second protrusion meets the upper surface of the first cladding layer.

7. The substrate with optical waveguide as claimed in claim 6, wherein the upper surface of the second protrusion has a same shape as the upper surface of the first protrusion.

8. An optical communication device comprising:
   the substrate with optical waveguide of claim 1; and
   either a light emitting device emitting light to the optical waveguide, a light receiving device receiving light emitted from the optical waveguide, or both.

* * * * *